United States Patent [19]

Aakalu et al.

[11] 3,741,292

[45] June 26, 1973

[54] LIQUID ENCAPSULATED AIR COOLED MODULE

[75] Inventors: Nanda Kumar G. Aakalu; Richard C. Chu; Robert E. Simons, all of Poughkeepsie, N.Y.

[73] Assignee: International Business Machines Corporation, Armonk, N.Y.

[22] Filed: June 30, 1971

[21] Appl. No.: 158,318

[52] U.S. Cl. .............. 165/105, 317/100, 317/234 B

[51] Int. Cl. .......................... F28d 15/00, H01l 1/12

[58] Field of Search ...................... 165/105, 80, 146; 317/100, 234 A, 234 B

[56] References Cited

UNITED STATES PATENTS

| | | | |
|---|---|---|---|
| 3,324,667 | 6/1967 | Muller | 165/105 X |
| 3,476,175 | 11/1969 | Plevyak | 165/105 |
| 3,270,250 | 8/1966 | Davis | 165/105 X |
| 3,417,814 | 12/1968 | Obtay | 317/100 X |
| 3,489,207 | 1/1970 | Miller | 165/105 |

FOREIGN PATENTS OR APPLICATIONS

| | | | |
|---|---|---|---|
| 769,888 | 6/1934 | France | 165/146 |

OTHER PUBLICATIONS

Bleher, J. H. et al. "Microelectronic Packaging," IBM Technical Disclosure Bulletin, Vol. 12, No. 5, 10/1969 (p. 727).

*Primary Examiner*—Albert W. Davis, Jr.
*Attorney*—Harold H. Sweeney, Jr. et al.

[57] ABSTRACT

A plurality of heat generating components are mounted on a substrate which has a container attached thereto in sealed relationship such that the heat generating components are exposed to the inside of the container. A low boiling point dielectric liquid partially fills the container and completely covers the heat generating components. A vapor space is located above the liquid level which is filled with internal fins extending inward into the container serving as a condenser for the dielectric liquid vapors. External fins extend outward from the container to serve as an air cooled sink for the internal fins condenser.

3 Claims, 3 Drawing Figures

PATENTED JUN 26 1973 3,741,292

INVENTORS
NANDA KUMAR G. AAKALU
RICHARD C. CHU
ROBERT E. SIMONS

BY Harold H. Sweeney Jr

ATTORNEY

LIQUID ENCAPSULATED AIR COOLED MODULE

This invention relates to the cooling of electronic components, and more particularly, to a liquid encapsulated air cooled module.

With the miniaturization capabilities afforded by the discovery fo solid state electronics, various improved means of dissipating the heat generated by solid state components have been investigated. The standard forced air convection means appears to have reached its limits of practicality in that the amount of air that is required to provide efficient cooling introduces a noise problem and without some auxiliary techniques cannot maintain each of a large number of components within its critical, narrow operating temperature range. Accordingly, especially in connection with large scale computer systems, various combinations of air-liquid cooling systems have been devised. One of the more recent systems investigated has been the immersion cooling system, wherein the array of components to be cooled is immersed in a tank of cooling liquid. The liquids used are the new fluorcarbon liquids which have a low-boiling point. These liquids are dielectric and give rise to various types of boiling at relatively low temperatures. The mode of boiling and consequently the heat transfer is dependent on the heat flux at the surface interface between the component to be cooled and the cooling liquid. For a small heat flux which causes a temperature below the boiling point of the liquid, natural convection will take place. As the heat flux increases the temperature beyond the boiling poing of the liquid, nucleate boiling will take place. The nucleate boiling causes the vaporization of the fluid immediately adjacent the hot component. As the vapor bubbles form and groi on the heated surface, they cause intense microconvection currents. Thus, nucleate boiling gives rise to an increase in convection within the liquid and, accordingly, improves the heat transfer between the hot surface and the liquid. As the heat flux increases, the nucleate boiling increases to the point where it or the number of bubbles increases to the point where they begin to coalesce and the limiting heat flux commonly known as departure from nucleate boiling (DNB) is reached. This point is considered as the practical limit for cooling electronics. These modes of boiling or heat transfer have proven to be very efficient. However, there are problems in servicing and packaging components which are cooled using these techniques.

It will be appreciated, that the components to be cooled in an immersion type cooling system are not readily available for servicing. Either the liquid must be drained from the tank holding the liquid in which the components are immersed or the entire array of components must be disconnected and removed from the cooling liquids. The servicing is fuurtther commplicatedd by the fact that the cooling liquids are very volatile and are easily contaminated.

In U. S. Pat. No. 3,512,582, issued May 19, 1970, an immersion type cooling arrangement is shown in which individual modules are cooled. Each modular unit contains an individual cooling chamber which is connected to a common vessel by respective input and output conduit means. The heat generating components are located in each of the cooling chambers in heat exchange contact with the low boiling point liquid so as to provide cooling. A heat exchanger is provided associated with each of the individual cooling chambers for removing the heat from the low-boiling-point liquid. The low-boiling-point liquid is provided from a common vessel by circulatory means which in this case is gravitational flow.

The main object of the present invention is to provide a cooling arrangement in which the module is encapsulated in liquid so as to be an independent cooling unit.

It is another object of the present invention to provide a liquid encapsulated module which is ultimately air cooled.

It is a further object of the present invention to provide a liquid encapsulated air cooled module which provides air turbulation characteristics when arranged in a vertical array of modules.

It is a further object of the present invention to provide a cooling system in which the cooling liquid is sealed from contamination.

Briefly, a liquid encapsulated air cooled module is provided which contains a plurality of heat generating components mounted on a substrate to which a container is attached in sealed relationship such that the heat generating components are exposed to the inside of the container. Alow boiling point dielectric liquid partially fills the container and completely covers the heat generating component. A vapor space is located above the liquid level within the container. Internal fins extend inward within the container into at least the vapor space thereby serving as a condenser for the dielectric liquid vapors. External fins extend outwardly of the container serving as an air cooled sink for the internal fin condenser.

The foregoing and other objects, features and advantages of the invention will be apparent from the following more particular description of a preferred embodiment of the invention, as illustrated in the accompanying drawings.

Figures 1, 2, 3:
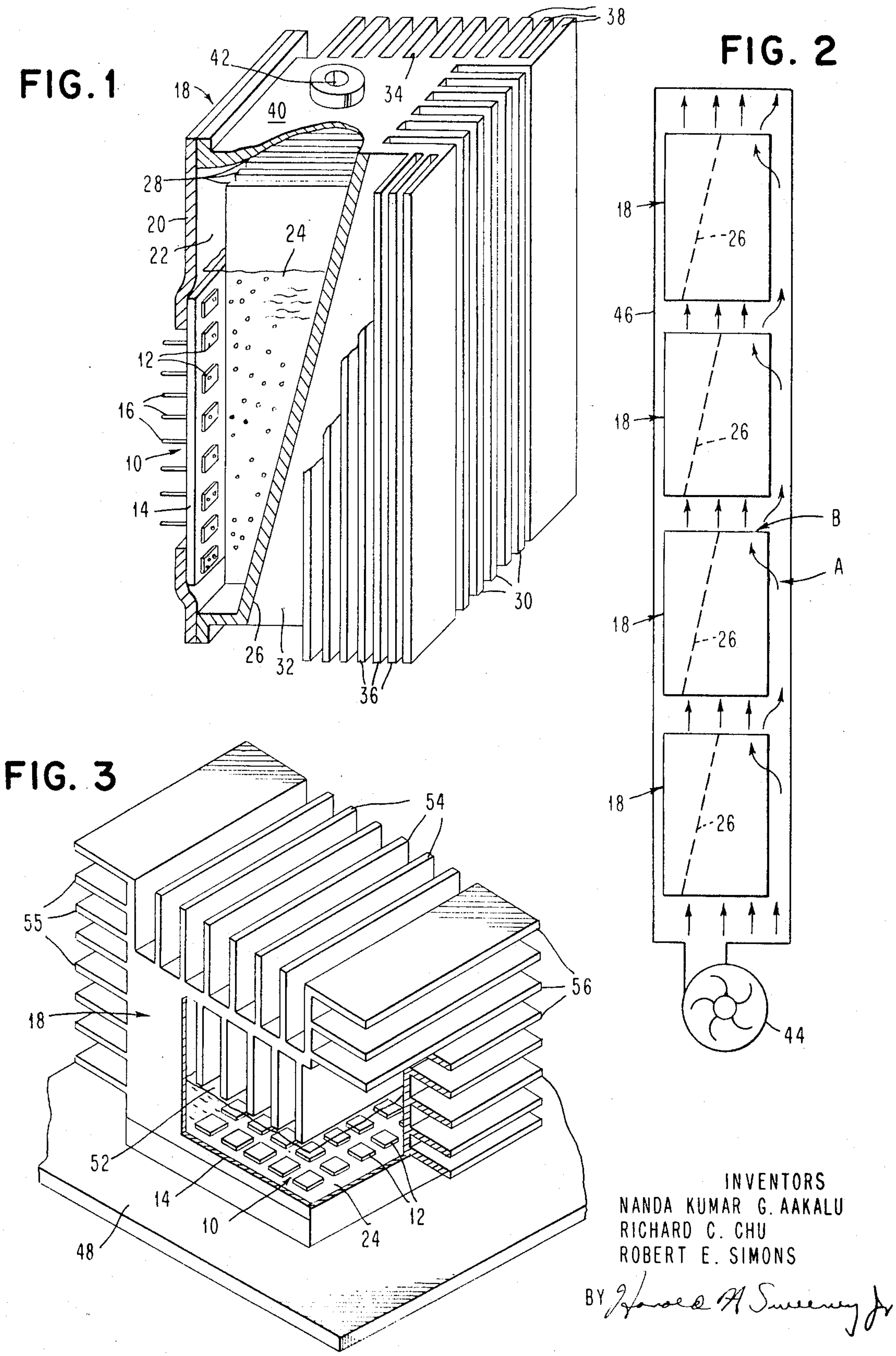
FIG. 1 is a partly sectioned isometric view of the liquid encapsulated air cooled module of the present invention.
FIG. 2 is a schematic view showing the liquid encapsulated air cooled modules arranged in a vertical array in the air cooling path.
FIG. 3 is a partly sectioned isometric view of a horizontally operable embodiment of the invention.

Referring to FIG. 1, there is shown an electronic module 10 which has a number of chips 12 located on a substrate 14. The chips 12 each contain a number of electronic circuits and are located along one surface of the substrate 14. Pins 16 extend from the chips 12 through the substrate 14 and out of the opposite surface thereof for connecting or plugging the module 10 into place. The chips 12 are arranged in columns on the substrate 14 although the arrangement is not limited to such a configuration. A container or can 18 is attached to the substrate 14 of the module 10 in sealed relationship. Actually, the module 10 forms a part of one of the walls of the container 18. A flange 20 extends upward from the substrate 14 to the top of the container. The length of the flange 20 determines the height of the vapor space 22 above the top of the module substrate 14.

The container 18 is partially filled with a low boiling point dielectric liquid 24 such as ohe of the fluorcarbons, for example, FC78 or FC88. The container 18 is filled to a height slightly above all of the chips 12. The area above the liquid level forms a vapor space 22. It will be appreciated that the dielectric chips 12. If the heat transfer area of the chips is too small for the amount of cooling required, it may be necessary to provide a heat sink attached to the chip.

The wall 26 opposite the wall containing the module 10, slopes outwared from bottom to top. Thus, the container 17 has a very narrow cross sectional area at the bottom and a much wider cross sectional area at the top. A plurality of fins 28 extend from the floped back wall 26 into the container 18. These fins 28 extend the same distance into the container 18 substantially filling the container. The fins 28 are parallel to one another and extend vertically within the container. Accordingly, the fin surface area in the vapor space 22, that is, the space above the liquid level, is much larger because of the slope of the back wall 26. It can be seen that the surface area of the internal fins 28 diminishes as the fins extend downward in the container, again because of the slope of the wall 26. External fins 30 extend from the opposite side of the sloped wall 26. These fins extend vertically along the wall and extend outwardly the same distance. Thus, the fin 30 surface area available near the top of the container is small in comparison to the fin surface area near the bottom of the container because of the slope of the back wall 26. The variation in surface area is a linear relationship since the slope of the wall 26 is a straight line. The other two side walls 32,34 of the container 18 have fins 36,38 extending therefrom, respectively. These side fins 36,38 run vertically along the walls so that air can pass upward therethrough. The top 40 of the container 18 has a liquid filling port 42.

In operation, the heat generated by the electronic chips 12 causes nucleate boiling, the bubbles of which rise in the dielectric liquid 24. The vapor from the boiling bubbles rises in the vapor space 22 as the bubbles emerge from the liquid surface. These vapors condense on the cooler internal fins 28. The heat is carried by the fins 28 through the wall 26 and into the internal fins 30 of the container. It will be appreciated, that the surface area of the internal fins 28 exposed in the vapor space 22 is quite large thus giving considerable area for the condensation of the vapors. Some of the vapor bubbles condense on the portion of the fins 28 that are located below the liquid surface level. This below-surface lelvel of the fins 28, also acts as a subcooler-condenser combination. It should be noted, that the submerged subcooler-condenser combination has less cooling area available as it descends further into the container. Thus, in the portion of the container where very little condensation or subcooling is required, that is, near the bottom, the area needed for such cooling is very small, while near the top of the liquid the cooling requirements are increased because of the increase in the boiling vapors reaching that area. Thus, the sloped wall 26 results in a container of a preferred shape as well as a preferred fin shape. The sloped wall also provides the further advantage that the air flowing through the external fins 30 of the container from below is converged by the sloping wall 26.

Referring to FIG. 2, there is shown schematically a number of the modules with the attached containers 18, arranged in a vertical array. A schematic representation of an air blower 44 is shown, with the arrows indicating the direction of the air flow. The sloped dotted line in each of the containers 18 represents the sloped wall 26 which has previously been described. It can be seen, that the air as it strikes the sloped wall 26 is converged outward at each of the successive vertically located container modules 18. Thus, the sloped wall also serves as an air turbulator. Because of the sloped wall 26, the air is caused to go from a high static pressure region A to a low static pressure region B thereby causing cross flow which improves the cooling of the fins. As can be seen, the various module containers 18 are located in channel 46 which essentially causes the air to be channelled in the vertical direction.

Referring to FIG. 3, there is shown an alternative embodiment of the invention, wherein the liquid encapsulated module 10 is designed for horizontal mounting rather than vertical mounting, as was the case in the previously described embodiment. As can be seen, the module 10 is plugged into a horizontal board 48 and, thus, the chips 12 and the substrate 14 are oriented horizontally. A small amount of dielectric liquid coolant 24 is utilized in this embodiment. It is only necessary that the chips 12 be completely submerged in the dielectric liquid coolant 24 so that nucleate boiling will take place. The internal fins 50 are shown extending downwardly into the vapor space 52 area above the liquid level. In this embodiment, the internal fins 50 area is maximized so that the cooling by condensation is maximum. The external fins 54,55,56 extend from the respective three side surfaces of the container 18. The fins 54,55,56 each meet their respective side of the container 18 at right angles and are parallel running horizontally along the walls so that the air flow entering at one end runs through the channels between the fins.

The self-contained cooling technique described is a liquid hybrid scheme which contains all the desirable features of liquid cooling, and yet remains ultimately air cooled. The cooling assembly or container 18 is so designed that it serves as an environmental protection cover for the module 10. Since the dielectric liquid coolant 24 is completely sealed within the container 18, there is no loss due to evaporation and a binary dielectric liquid can be utilized. A binary liquid consists of a mixture of two dielectric liquids having different characteristics such as boiling points. Thus, a binary liquid can be selected which gives the best heat transfer characteristics for the amount of heat expected to be generated by the module. Also, a binary mixture is selected that gives the minimum amount of pressure buildup in the container 18. The problem in using binary dielectric liquids in non-sealed systems generally is that they tend to evaporate at different rates so that the binary mixture or binary mixing ratio changes when loss of liquid takes place. This changes the desired mixing ratio of the binary liquid.

The resulting container 18 with the various fins is of a sufficiently small size that it provides good mechanical handling capabilities so that it can be easily plugged into place. It should also be appreciated, that the container 18 arrangement shown in FIG. 1, with the sloping back wall 26, provides a minimum container size and, therefore, a minimum amount of dielectric liquid is required.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A liquid encapsulated air-cooled module comprising:

a plurality of heat generating components mounted on a substrate;

a container attached to said substrate in sealed relationship such that such substrate forms a vertical side wall to the inside of said container; said container having the side wall opposite said substrate sloped outward from bottom to top so that the container is wider at the top than at the bottom;

a low boiling point dielectric liquid partially filling said container and completely covering said heat generating components;

a vapor space located above the liquid surface level;

internal fins extending into said container from said sloped side wall substantially filling said container, said fins running vertically within said container so that a large fin area is in said vapor space providing a large condenser for said liquid vapors, said internal fins being reduced ih surface area as the bottom of said container is approached thereby forming a combination condenser - subcooler below the liquid surface level; and external fins extending outward from said sloped side wall of said container and extending vertically so that air flows therebetween from bottom to top of said container, said sloped side wall acting as a turbulator for the upward flowing air.

2. A liquid encapsulated air-cooled module according to claim 1, wherein external fins extend from and run vertically with said other two side walls of said container so that additional air cooling area and air flow balance is provided.

3. A iquid encapsulated air-cooled module according to claim 1, wherein said low boiling point dielectric liquid is a binary mixture selected to give the maximum heat flux from the heat generating components with the minimum pressure buildup within the container.

* * * * *